United States Patent
Yuan et al.

(10) Patent No.: US 11,395,214 B2
(45) Date of Patent: Jul. 19, 2022

(54) METHOD FOR OBTAINING SLICE INFORMATION AND RELAY APPARATUS

(71) Applicant: HUAWEI TECHNOLOGIES CO., LTD., Guangdong (CN)

(72) Inventors: Shitong Yuan, Chengdu (CN); You Li, Shenzhen (CN); Feng Han, Shanghai (CN); Mingzeng Dai, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 12 days.

(21) Appl. No.: 17/004,378

(22) Filed: Aug. 27, 2020

(65) Prior Publication Data

US 2020/0396674 A1 Dec. 17, 2020

Related U.S. Application Data

(63) Continuation of application No. PCT/CN2019/074402, filed on Feb. 1, 2019.

(30) Foreign Application Priority Data

Feb. 28, 2018 (CN) .......................... 201810169399.4

(51) Int. Cl.
*H04W 48/16* (2009.01)
*H04W 16/26* (2009.01)
(Continued)

(52) U.S. Cl.
CPC .......... *H04W 48/16* (2013.01); *H04W 16/26* (2013.01); *H04W 48/10* (2013.01); *H04W 48/18* (2013.01); *H04W 74/0833* (2013.01)

(58) Field of Classification Search
CPC ...... A01G 31/02; A01G 25/16; A01G 27/008; A01G 2031/006; A01G 31/00;
(Continued)

(56) References Cited

U.S. PATENT DOCUMENTS

2017/0331785 A1  11/2017  Xu et al.
2018/0035399 A1   2/2018  Xu et al.
(Continued)

FOREIGN PATENT DOCUMENTS

CN   106572517 A   4/2017
CN   106851589 A   6/2017
(Continued)

OTHER PUBLICATIONS

3GPP TS 29.531 V0.3.0 (Jan. 2018), 3rd Generation Partnership Project;Technical Specification Group Core Network and Terminals;5G System;Network Slice Selection Services, Stage 3(Release 15), 29 pages.
(Continued)

*Primary Examiner* — Diane D Mizrahi
(74) *Attorney, Agent, or Firm* — WHDA, LLP

(57) ABSTRACT

Embodiments of this application disclose a relay apparatus and a method for obtaining slice information. The method is applied to a scenario in which a relay apparatus is connected to at least two access network devices. The method comprises: the relay apparatus receives first indication information sent by a user terminal, wherein the first indication information is used to indicate a slice service requested by the user terminal; and the relay apparatus sends the first indication information to a target access network device in the access network devices.

16 Claims, 9 Drawing Sheets

(51) Int. Cl.
    *H04W 48/10*     (2009.01)
    *H04W 48/18*     (2009.01)
    *H04W 74/08*     (2009.01)

(58) Field of Classification Search
    CPC ..... H04W 48/16; H04W 16/26; H04W 48/10;
        H04W 48/18; H04W 74/0833; H04W
        84/047; H04W 88/04; H04W 4/06; H04W
        28/16; H04W 48/12; H04W 74/08; H04W
        76/27; H04L 41/5041; H04L 41/0893;
        H04B 7/155; H04B 7/15535
    See application file for complete search history.

(56) References Cited

U.S. PATENT DOCUMENTS

| | | | |
|---|---|---|---|
| 2018/0054237 A1 | 2/2018 | Tseng et al. | |
| 2019/0364492 A1* | 11/2019 | Azizi | .................. H04W 48/16 |

FOREIGN PATENT DOCUMENTS

| | | |
|---|---|---|
| CN | 107223350 A | 9/2017 |
| CN | 107347205 A | 11/2017 |
| CN | 107426797 A | 12/2017 |
| CN | 107566145 A | 1/2018 |

OTHER PUBLICATIONS

Document No. H2020-ICT-671650-mmMAGIC/D6.6. Final mmMAGIC system concept. Millimetre-Wave Based Mobile Radio Access Network for Fifth Generation Integrated Communications (mmMAGIC), Dec. 7, 2017, 110 pages.

3GPP TS 22.261 V16.2.0 (Dec. 2017), 3rd Generation Partnership Project;Technical Specification Group Services and System Aspects-;Service requirements for the 5G system;Stage 1 (Release 16), 53 pages.

3GPP TR 36.746 V15.1.0 (Dec. 2017), 3rd Generation Partnership Project;Technical Specification Group Radio Access Network;Study on further enhancements to LTE Device to Device (D2D),User Equipment (UE) to network relays for Internet of Things (IoT) and wearables; (Release 15), 55 pages.

3GPP TS 36.331 V15.0.1 (Jan. 2018), 3rd Generation Partnership Project;Technical Specification Group Radio Access Network,Evolved Universal Terrestrial Radio Access (E-UTRA); Radio Resource Control (RRC);Protocol specification (Release 15), 776 pages.

Office Action dated Mar. 20, 2020, issued in counterpart CN Application No. 201810169399.4, with English Translation. (22 pages).

International Search Report dated Apr. 12, 2019, issued in counterpart Application No. PCT/CN2019/074402, with English Translation. (11 pages).

Notice of Allowance dated Mar. 2, 2021, issued in counterpart CN Application No. 201810169399.4, with English Translation. (10 pages).

ZTE: 11Consideration on RAN Side Network 11-15 S I icing 11, 3GPP Draft; R3-160821,Apr. 1, 2016 (Apr. 1, 2016). XP051082958, total 10 pages.

Extended (Supplementary) European Search Report dated Mar. 5, 2021, issued in counterpart EP Application No. 19760486.1. (9 pages).

\* cited by examiner

METHOD FOR OBTAINING SLICE INFORMATION AND RELAY APPARATUS

CROSS-REFERENCE TO RELATED APPLICATIONS

This application is a continuation of International Application No. PCT/CN2019/074402, filed on Feb. 1, 2019, which claims priority to Chinese Patent Application No. 201810169399.4, filed on Feb. 28, 2018, The disclosures of the aforementioned applications are hereby incorporated by reference in their entireties.

TECHNICAL FIELD

This application relates to the communications field, and in particular, to a method for obtaining slice information and a relay apparatus.

BACKGROUND

In long term evolution (LTE), a "one-size-fits-all" network architecture of a conventional cellular network is specifically supported and has an information and communications technology (ICT) system. The network architecture can be used to predict traffic and traffic growth, and is significantly applicable to a single-service user network. However, it is difficult for operators to expand a telecommunications network by using such a vertical architecture. It is also difficult for the operators to perform adjustment based on user requirements that continuously change and meet requirements of new use cases.

In a future 5G system, a network is further abstracted into slices, so that in a same physical architecture, network resources are obtained, based on requirements, through slicing. A user terminal may accept services from different slices in a network. The slices are independent of each other, indicating that if a slice service carried on one slice changes, a slice service carried on another slice should not be affected. Therefore, in the 5G era, the conventional cellular network and a "one-size-fits-all" method need to be adjusted to support thousands of use cases, a plurality of user types, and use of various applications.

However, in the 5G system, different access network devices may support different slice services. Therefore, to receive services corresponding to a plurality of slice services in the network, the user terminal needs a new mechanism to ensure that a user obtains information about more slice services.

SUMMARY

Embodiments of this application provide a method for obtaining slice information and a relay apparatus, to support a user terminal in obtaining slice information of slice services supported by a plurality of access network devices, thereby ensuring that the user terminal receives services corresponding to a plurality of slice services in a network.

According to a first aspect, an embodiment of this application provides a method for obtaining slice information, where the method is applied to a scenario in which a first relay apparatus is connected to at least two access network devices, the at least two access network devices include a first access network device and a second access network device, and the method includes:

obtaining, by the first relay apparatus, first slice information of at least one slice service supported by the first access network device and second slice information of at least one slice service supported by the second access network device; and then sending, by the first relay apparatus, a broadcast message that includes the first slice information and the second slice information to a user terminal.

It may be understood that the slice service is service data carried on a slice. The slice is a combination of network functions and resources required for completing one or more services, and is a complete logical network. The slice can be used to flexibly allocate and re-allocate resources based on user requirements. It may be understood that a set of hardware is used to perform a plurality of software-defined functions. A geographical coverage area, duration, a capacity, a speed, a delay, reliability, security, availability, and the like of a network are defined based on the software functions. For example, a physical network is sliced into a plurality of service-based networks, that is, network resources are allocated for services. It is fully ensured that each slice includes dedicated resources such as a virtual server, network bandwidth, and service quality. In addition, slices are isolated from each other. Therefore, if an error occurs in the slice or the slice is faulty, communication for another slice is not affected.

The slice information includes at least one of a slice identity (ID) of a slice service supported by an access network device, a service type of the slice service, a slice type of the slice service, and an ID of the slice type. That is, the slice information is used by the user terminal to identify the slice service.

In the technical solution provided in this embodiment of this application, the relay apparatus obtains slice information corresponding to an access network device connected to the relay apparatus, and then broadcasts the slice information to the user terminal, so that the user terminal can obtain slice information of slice services supported by a plurality of access network devices, thereby ensuring that the user terminal receives services corresponding to a plurality of slice services in a network.

Optionally, if the first access network device is a master access network device connected to the first relay apparatus, and the second access network device is a secondary access network device connected to the first relay apparatus, the first slice information is carried in an RRC configuration message or a system message, and the RRC configuration message or the system message is sent by the first access network device to the first relay apparatus; and the second slice information is carried in a first RRC message, a second RRC message, or a third RRC message, the first RRC message is sent by the first access network device to the first relay apparatus, the second RRC message is forwarded by the first access network device to the first relay apparatus after being sent by the second access network device to the first access network device, and the third RRC message is sent by the second access network device to the first relay apparatus.

An RRC message in this embodiment of this application may be the RRC configuration message, or may be the system message. The RRC configuration message is information configured for the user terminal or the relay apparatus when a connection is established between the access network device and the user terminal or the relay apparatus, and the user terminal or the relay apparatus may learn of the RRC configuration message. The system message is a message broadcast by the access network device, and all user terminals or relay apparatuses in a coverage area of the access network device may learn of the system message.

In the technical solution provided in this embodiment of this application, the relay apparatus may obtain, in a plurality of manners, the slice information of the slice service supported by the access network device connected to the relay apparatus, thereby improving flexibility and integrity of obtaining the slice information.

Optionally, if the first access network device is the master access network device connected to the first relay apparatus, and the second access network device is the secondary access network device connected to the first relay apparatus, the broadcast message includes the first slice information and the second slice information when the first relay apparatus and the second access network device meet a preset condition; and the preset condition includes at least one of the following:

the first access network device configures the second access network device to transmit data to the first relay apparatus; and the first relay apparatus and the second access network device are in an inactive-connected state. It may be understood that the first relay apparatus and the second access network device are in the inactive-connected state, indicating that the two nodes store a context for establishing a link, where the context includes a link parameter configuration and a bearer parameter configuration. When a connection between the relay apparatus and the secondary donor base station needs to be established, the connection is quickly established through a random access process, or without the random access process, the connection is directly established, based on a grant-free backhaul resource configured by the second access network device, in a state in which time alignment (TA) is maintained between the two nodes.

In the technical solution provided in this embodiment of this application, the relay apparatus screens slice information based on the preset condition, to ensure that the user terminal can accurately learn of slice information of a slice service supported by the relay apparatus, thereby effectively reducing an error rate of slice service selection.

Optionally, the first relay apparatus may further receive third slice information broadcast by a second relay apparatus, where the third slice information is slice information of at least one slice service supported by the second relay apparatus; and then the first relay apparatus sends the broadcast message including the third slice information, the first slice information, and the first slice information to the user terminal.

In the technical solution provided in this embodiment of this application, the relay apparatus obtains slice information of a slice service supported by another relay apparatus in a multi-hop scenario, thereby ensuring completeness of the slice service.

According to a second aspect, an embodiment of this application provides a data processing method, where the method is applied to a scenario in which a relay apparatus is connected to at least two access network devices, and the method specifically includes:

receiving, by the relay apparatus, first indication information sent by a user terminal, where the first indication information is used to request a slice service; and sending, by the relay apparatus, the first indication information to a target access network device in the at least two access network devices connected to the relay apparatus.

In this embodiment of this application, the first indication information may be carried in a service request, or may be sent independently. This is not specifically limited herein.

In the technical solution provided in this embodiment of this application, the relay apparatus sends, to an access network device, the first indication information sent by the user terminal, thereby ensuring that the user terminal accepts a service corresponding to the slice service.

Optionally, a specific operation of sending, by the relay apparatus to the target access network device, the first indication information sent by the user terminal includes the following several possible manners.

In a possible implementation, after the relay apparatus receives the first indication information, if the relay apparatus can parse the first indication information, the relay apparatus generates a data packet that can be parsed and identified by the access network device, where the data packet includes the first indication information; and then the relay apparatus sends the data packet to the at least two access network devices.

In another possible implementation, after the relay apparatus receives the first indication information, if the relay apparatus can parse the first indication information, the relay apparatus generates a data packet that can be parsed and identified by the access network device, where the data packet includes all content in the first indication information; and then the relay apparatus sends, based on slice information that the relay device has learned of, the data packet to the access network device corresponding to the slice service requested in the first indication information.

In another possible implementation, after the relay apparatus receives the first indication information, if the relay apparatus can parse the first indication information, the relay apparatus determines the target access network device based on the first indication information and slice information of a slice service supported by the relay apparatus; the relay apparatus generates a target data packet that can be parsed and identified by the target access network device, where the target data packet includes the first indication information; and then the relay apparatus sends the target data packet to the target access network devices.

In another possible implementation, after the relay apparatus receives the first indication information, if the relay apparatus cannot parse the first indication information, the relay apparatus forwards the first indication information to the at least two access network devices.

In another possible implementation, after the relay apparatus receives the first indication information, if the relay apparatus cannot parse the first indication information, the relay apparatus forwards the first indication information to a master access network device in the at least two access network devices that is connected to the relay apparatus; the relay apparatus receives feedback information sent by the master access network device, where the feedback information is used to indicate the slice service requested in the first indication information; and the relay apparatus forwards the feedback information to an access network device other than the master access network device in the at least two access network devices, or forwards, based on slice information of a slice service supported by the relay apparatus, the feedback information to the access network device corresponding to the slice service requested in the first indication information.

In another possible implementation, when receiving the first indication information, the relay apparatus may further receive second indication information that is sent by the user terminal and that can be parsed by the relay apparatus, where the second indication information is used to indicate the slice service requested in the first indication information; and finally the relay apparatus forwards, based on the second indication information, the first indication information to all access network devices or the access network device corresponding to the slice service requested in the first indication information.

In another possible implementation, after the relay apparatus receives the first indication information, if the relay apparatus cannot parse the first indication information, the relay apparatus forwards the first indication information to a master access network device in the at least two access network devices that is connected to the relay apparatus, or forwards the first indication information to a transmission link in which the master access network device is located.

In another possible implementation, after the relay apparatus receives the first indication information, if the relay apparatus cannot parse the first indication information, the relay apparatus forwards the first indication information to the target access network device in the at least two access network devices based on configuration information, where the configuration information is used to indicate the relay apparatus to forward the first indication information to some access network devices in the access network devices, and the some access network devices serve as the target access network devices; or the configuration information is used to indicate the relay apparatus to forward, when the first indication information is used to indicate a specific slice service requested by the user terminal, the first indication information to a specific access network device in the at least two access network devices that corresponds to the specific slice service, and the specific access network device serves as the target access network device.

In the technical solution provided in this embodiment of this application, the relay apparatus may use a plurality of manners to send, to the access network device, the first indication information sent by the user terminal, thereby implementing that the user terminal accepts the service corresponding to the slice service.

According to a third aspect, an embodiment of this application provides a resource configuration method, where the method is applied to a scenario in which a relay apparatus is connected to at least two access network devices, and the method specifically includes:
obtaining, by the relay apparatus, slice information of a slice service supported by the relay apparatus; then allocating, by the relay apparatus, a random access resource for the slice service; and finally broadcasting, by the relay apparatus, random access resource allocation information to the user terminal.

In the technical solution provided in this embodiment of this application, the relay apparatus allocates the random access resource for the slice service supported by the relay apparatus, to ensure a smooth network, thereby ensuring better experience of the user terminal when the user terminal accepts a service corresponding to the slice service.

Optionally, on the premise that a quantity of random access resources allocated by the relay apparatus for the slice service does not exceed a total quantity of random access resources allocated by the relay apparatus, the relay apparatus may allocate the random access resources for the slice service in the following manners.

In a possible implementation, the relay apparatus classifies, based on service attributes, slice services supported by the relay apparatus. Slice services having same service attributes are classified into one type, and the relay apparatus allocates reused random access resources for the slice services.

In another possible implementation, the relay apparatus allocates a corresponding random access resource for each of the slice services supported by the relay apparatus.

In another possible implementation, the relay apparatus obtains the random access resource allocation information used for an access network device connected to the relay apparatus, where the random access resource allocation information is used to indicate a random access resource allocation ratio between slice services supported by the access network device connected to the relay apparatus; and then the relay apparatus allocates, based on the random access resource allocation ratio, the random access resource for the slice service supported by the relay apparatus.

In the technical solution provided in this embodiment of this application, the relay apparatus uses a plurality of manners to allocate the random access resource for the slice service supported by the relay apparatus, to improve a utilization rate of the random access resource.

According to a fourth aspect, an embodiment of this application provides a relay apparatus. The first relay apparatus in the foregoing method is used as an example, and the following implementations are specifically included.

In a possible implementation, the relay apparatus includes:
a receiving module, configured to: obtain first slice information of at least one slice service supported by the first access network device; and obtain second slice information of at least one slice service supported by a second access network device; and
a sending module, configured to send a broadcast message to a user terminal, where the broadcast message includes the first slice information and the second slice information.

In another possible implementation, the relay apparatus includes:
a transceiver, a processor, and a bus, where
the transceiver is connected to the processor by using the bus; and
the transceiver is configured to:
obtain first slice information of at least one slice service supported by the first access network device; obtain second slice information of at least one slice service supported by a second access network device; and send a broadcast message to a user terminal, where the broadcast message includes the first slice information and the second slice information.

According to a fifth aspect, an embodiment of this application provides a relay apparatus. The following implementations corresponding to the method in the foregoing second aspect are specifically included.

In a possible implementation, the relay apparatus includes:
a receiving module, configured to receive first indication information sent by a user terminal, where the first indication information is used to indicate a slice service requested by the user terminal; and
a sending module, configured to send the first indication information to a target access network device in the at least two access network devices.

In another possible implementation, the relay apparatus includes:
a transceiver, a processor, and a bus, where
the transceiver is connected to the processor by using the bus; and
the transceiver is configured to:
receive first indication information sent by a user terminal, where the first indication information is used to indicate a slice service requested by the user terminal; and
send the first indication information to a target access network device in the at least two access network devices.

According to a sixth aspect, an embodiment of this application provides a relay apparatus. The following implementations corresponding to the method in the foregoing third aspect are specifically included.

In a possible implementation, the relay apparatus includes:

an obtaining module, configured to obtain slice information of a slice service supported by the relay apparatus;

a processing module, configured to allocate a random access resource for the slice service; and a sending module, configured to broadcast the random access resource to a user terminal.

In another possible implementation, the relay apparatus includes:

a transceiver, a processor, and a bus, where the transceiver is connected to the processor by using the bus;

the transceiver is configured to:

obtain slice information of a slice service supported by the relay apparatus;

the processor is configured to:

allocate a random access resource for the slice service; and the transceiver is configured to:

broadcast the random access resource to a user terminal.

According to a seventh aspect, an embodiment of this application provides a computer-readable storage medium including an instruction. When the instruction is run on a computer, the computer performs the methods according to the foregoing first to third aspects.

According to an eighth aspect, an embodiment of this application provides a computer program product including an instruction. When the computer program product runs on a computer, the computer performs the methods according to the foregoing first to third aspects.

DESCRIPTION OF EMBODIMENTS

Embodiments of this application provide a method for obtaining slice information and a relay apparatus, to support a user terminal in obtaining slice information of slice services supported by a plurality of access network devices, thereby ensuring that the user terminal receives services corresponding to a plurality of slice services in a network.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances, so that the embodiments described herein can be implemented in orders other than an order illustrated or described herein. Moreover, the terms "include", "contain" and any other variants are intended to cover non-exclusive inclusion. For example, a process, method, system, product, or device that includes a list of steps or units is not necessarily limited to those steps or units expressly listed, but may include other steps or units not expressly listed or inherent to the process, method, product, or device.

In LTE, a "one-size-fits-all" network architecture of a conventional cellular network is specifically supported and has an ICT system. The network architecture can be used to predict traffic and traffic growth, and is significantly applicable to a single-service user network. However, it is difficult for operators to expand a telecommunications network by using such a vertical architecture. It is also difficult for the operators to perform adjustment based on user requirements that continuously change and meet requirements of new use cases.

Figure 1:
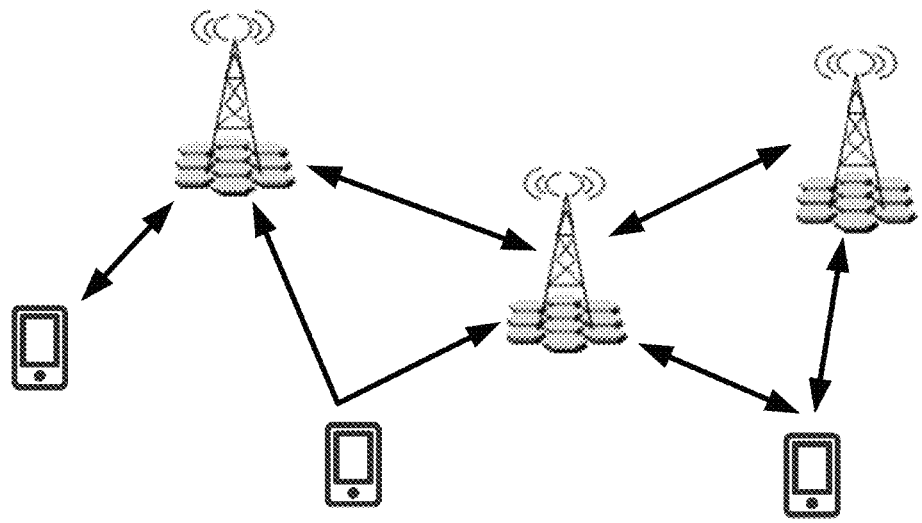
FIG. 1 is an architectural diagram of a scenario in which a relay apparatus is connected to at least two access network devices according to an embodiment of this application.

In a scenario shown in FIG. 1, a user terminal is connected to a plurality of base stations (herein, the base stations serve as access network devices) for communication. In a 5G system, a network is further abstracted into slices, so that in a same physical architecture, network resources are obtained, based on requirements, through slicing. The user terminal may accept services from different slices in a network. The slices are independent of each other, indicating that if a slice service carried on one slice changes, a slice service carried on another slice should not be affected. Therefore, in the 5G era, the conventional cellular network and a "one-size-fits-all" method need to be adjusted to support thousands of use cases, a plurality of user types, and use of various applications. However, in the 5G system, different access network devices may support different slice services. Therefore, to receive services corresponding to a plurality of slice services in the network, the user terminal needs a new mechanism to ensure that a user obtains information about more slice services.

The slice service is service data carried on the slice. The slice is a combination of network functions and resources required for completing one or more services, and is a complete logical network. The slice can be used to flexibly allocate and re-allocate resources based on user requirements. It may be understood that a set of hardware is used to perform a plurality of software-defined functions. A geographical coverage area, duration, a capacity, a speed, a delay, reliability, security, availability, and the like of the network are defined based on the software functions. For example, a physical network is sliced into a plurality of service-based networks, that is, network resources are allocated for services. It is fully ensured that each slice includes dedicated resources such as a virtual server, network bandwidth, and service quality. In addition, slices are isolated from each other. Therefore, if an error occurs in the slice or the slice is faulty, communication for another slice is not affected.

To resolve the foregoing problem, the embodiments of this application provide a solution as follows. The first relay apparatus is connected to at least two access network devices, where the at least two access network devices include a first access network device and a second access network device, and the solution includes: obtaining, by the first relay apparatus, first slice information of at least one slice service supported by the first access network device; obtaining, by the first relay apparatus, second slice information of at least one slice service supported by the second access network device; and sending, by the first relay apparatus, a broadcast message to the user terminal, where the broadcast message includes the first slice information and the second slice information.

In the embodiments of this application, the access network device may be a device such as a base station or a router, configured to remotely access a network resource.

Figure 2:
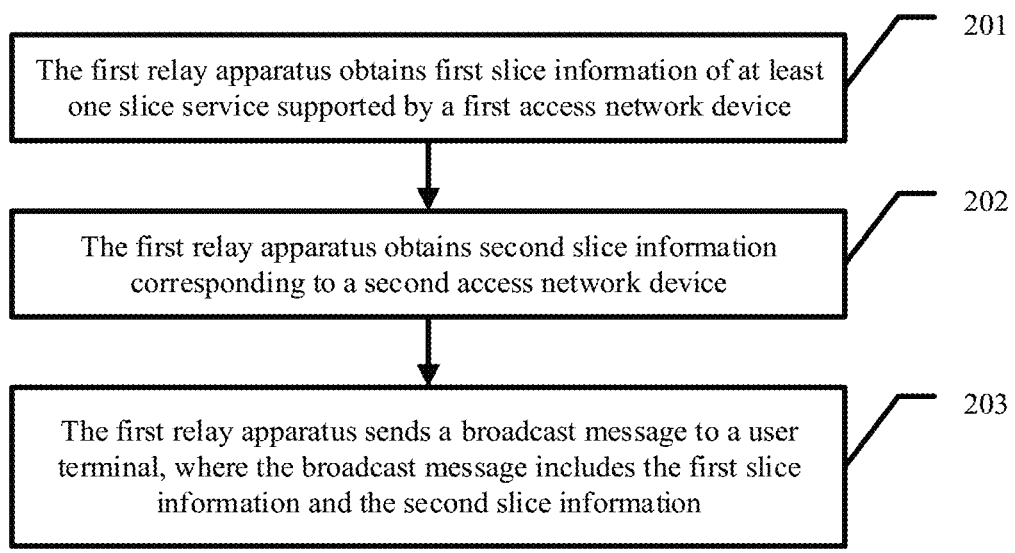
FIG. 2 is a schematic diagram of an embodiment of a method for obtaining slice information according to an embodiment of this application.

For details, refer to FIG. 2. FIG. 2 shows an embodiment of a method for obtaining slice information according to an embodiment of this application, including the following steps.

201: The first relay apparatus obtains first slice information of at least one slice service supported by a first access network device.

The relay apparatus is connected to the first access network device, and the relay apparatus obtains the first slice information of the at least one slice service supported by the first access network device.

In this embodiment, the slice information includes at least one of a slice identity (ID) of the slice service supported by an access network device, a service type of the slice service, a slice type of the slice service, and an ID of the slice type. That is, a user terminal only needs to know slice services supported by access network devices. A specific identification manner is not limited herein.

In this embodiment, the relay apparatus (which may also be referred to as an integrated access and backhaul (IAB) node) may be a relay node or may be the user terminal. When the relay apparatus is the user terminal, the relay apparatus may be applied to a scenario in which the user terminal serves as a relay apparatus to allow another user terminal to perform wireless access, for example, a smartwatch is connected to a mobile phone. In this embodiment of this application, the method for obtaining slice information is described by using an example in which the relay apparatus is the relay node.

202: The first relay apparatus obtains second slice information corresponding to a second access network device.

The relay apparatus is connected to the second access network device, and the relay apparatus obtains the second slice information of at least one slice service supported by the second access network device.

In this embodiment, there is no sequence between step 201 and step 202. Alternatively, step 202 may be performed before step 201, provided that slice information of slice services separately supported by the first access network device and the second access network device can be obtained. A specific execution sequence is not limited herein.

203: The first relay apparatus sends a broadcast message to the user terminal, where the broadcast message includes the first slice information and the second slice information.

The relay apparatus sends, to the user terminal, the broadcast message that includes the first slice information and the second slice information and that is sent by the relay apparatus.

In this embodiment, the broadcast message sent by the relay apparatus may further be directly broadcast to another relay apparatus. In this way, the another relay apparatus may also know slice information of a slice service supported by an upstream base station connected to the relay apparatus.

In this embodiment, the relay apparatus may further receive access control information sent by an access network device connected to the relay apparatus. The access control information includes information such as a forbidden service type. Then, the relay apparatus performs an operation indicated, by using information, by all access network devices connected to the relay apparatus. For example, the relay apparatus receives the first slice information and the second slice information. The first slice information is used to indicate that the first access network device supports a slice service 1 and a slice service 2, and the second slice information is used to indicate that the second access network device supports a slice service 3 and a slice service 4. In addition, the relay apparatus further receives access control information sent by the first access network device, where the access control information is used to indicate the relay apparatus to forbid transmitting information about the slice service 2. The relay node further receives access control information sent by the second access network device, where the access control information is used to indicate the relay apparatus to forbid transmitting information about the slice service 2 and the slice service 3. In this way, the relay apparatus forbids broadcasting the information about the slice service 2.

In this embodiment, the relay apparatus obtains slice information corresponding to an access network device connected to the relay apparatus, and then broadcasts the slice information to the user terminal, so that the user terminal can obtain slice information of slice services supported by a plurality of access network devices, thereby ensuring that the user terminal can accept services corresponding to a plurality of slice services in a network.

In a scenario in which communication for a communications network is performed by using a carrier aggregation technology, it is assumed that the first access network device in this embodiment of this application is a master donor base station connected to the relay apparatus, and the second access network device is a secondary donor base station connected to the relay apparatus. The master donor base station is a base station that serves a master cell group, and the secondary donor base station is a base station that serves a secondary cell group. In an application scenario shown in FIG. 3, the relay apparatus is directly connected to a donor base station. In this case, FIG. 4 specifically shows another embodiment of obtaining slice information according to this embodiment of this application, including the following steps.

401: The relay apparatus obtains first slice information of at least one slice service supported by the master donor base station.

A specific manner in which the relay apparatus obtains the first slice information may be as follows.

In a possible implementation, for an initial connection between the relay apparatus and the master donor base station, an RRC configuration connection is established between the relay apparatus and the master donor base station. During the RRC configuration connection, the relay apparatus may report a slice request to the master donor base station by using an RRC configuration message, and then the master donor base station feeds back, to the relay apparatus by using the RRC configuration message, slice information of the slice service supported by the master donor base station and slice information that is of a slice service supported by another base station and that is learned of by the master donor base station.

In another possible implementation, before a connection is established between the relay apparatus and the master donor base station, the relay apparatus may receive a system message broadcast by the master donor base station. The system message includes slice information of the slice service supported by the master donor base station.

In another possible implementation, signaling interworking is performed between the relay apparatus and an access network device through an F1AP interface, an Un interface, or an interface having a similar function. The signaling carries the slice information.

Figure 3:
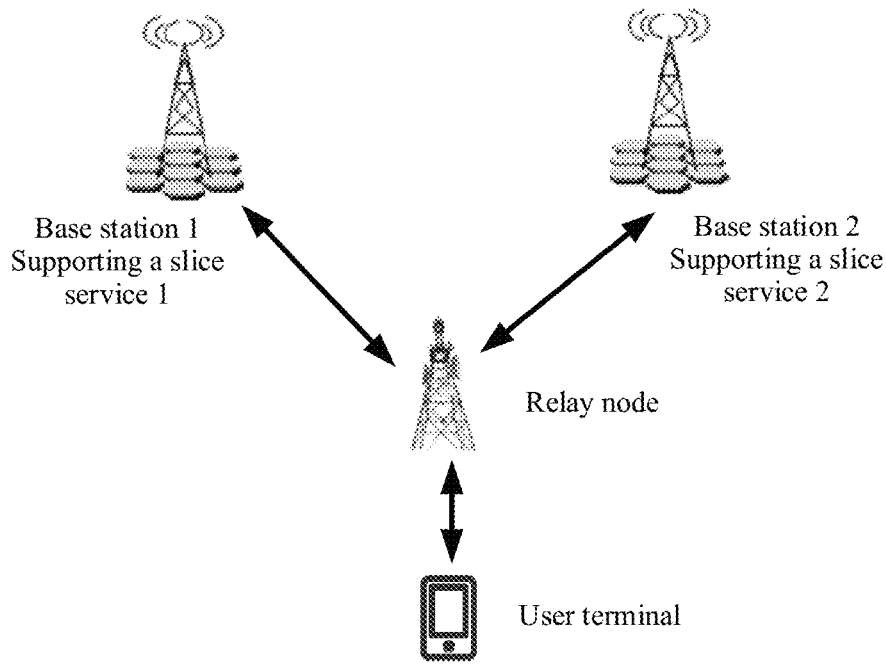
FIG. 3 is a diagram of a connection relationship between a user terminal, a relay node, and a base station according to an embodiment of this application.

For example, the relay apparatus determines that the master donor base station is a base station 1 shown in FIG. 3, where a slice service supported by the base station 1 is a slice 1, and determines that the secondary donor base station is a base station 2 shown in FIG. 3. In this way, the first slice information obtained by the relay apparatus is slice information of the slice 1 supported by the base station 1.

402: The relay apparatus obtains second slice information of at least one slice service supported by the secondary donor base station.

The relay apparatus may obtain the second slice information corresponding to the secondary donor base station in the following several possible implementations. The implementations specifically are as follows.

In a possible implementation, the master donor base station determines whether to configure the secondary donor base station to assist the relay apparatus in performing transmission. In this way, the relay apparatus measures signal quality at the secondary donor base station to obtain a measurement result, and reports the measurement result to the master donor base station. When the master donor base station determines that the secondary donor base station serves as a base station that assists the relay apparatus in performing the transmission, the master donor base station sends a first RRC message to the relay apparatus. The first RRC message is configured by the master donor base station for the secondary donor base station, and includes the second slice information of the slice service supported by the secondary donor base station.

In another possible implementation, the master donor base station determines whether to configure the secondary donor base station to assist the relay apparatus in performing transmission. In this way, the relay apparatus measures signal quality at the secondary donor base station to obtain a measurement result, and reports the measurement result to the master donor base station. When the master donor base station determines that the secondary donor base station serves as a base station that assists the relay apparatus in performing the transmission, the master donor base station sends a second RRC message to the relay apparatus. The second RRC message is sent by the secondary donor base station to the master donor base station, and includes the second slice information of the slice service supported by the secondary donor base station.

In another possible implementation, alternatively, the relay apparatus may not need to determine the secondary donor base station by using the master donor base station (for example, the relay apparatus directly stores a list of master and secondary donor base stations, and the relay apparatus may determine, based on the list of master and secondary donor base stations, whether to establish a connection to the secondary donor base station). For an initial connection between the relay apparatus and the secondary donor base station, an RRC configuration connection is established between the relay apparatus and the secondary donor base station. During the RRC configuration connection, the relay apparatus may report a slice request to the secondary donor base station by using an RRC configuration message, and then the secondary donor base station feeds back, to the relay apparatus by using the RRC configuration message, slice information of the slice service supported by the secondary donor base station and slice information that is of a slice service supported by another base station and that is learned of by the secondary donor base station.

In another possible implementation, the relay apparatus does not need to configure, by using the master donor base station, the secondary donor base station to assist the relay apparatus in performing transmission (for example, the relay apparatus directly stores a list of master and secondary donor base stations, and the relay apparatus may determine, based on the list of master and secondary donor base stations, whether to establish a connection to the secondary donor base station). Before the connection is established between the relay apparatus and the secondary donor base station, the relay apparatus may receive a system message broadcast by the secondary donor base station. The system message includes slice information of the slice service supported by the master donor base station and slice information that is of a slice service supported by another base station and that is learned of by the secondary donor base station.

It may be understood that the master donor base station and the secondary donor base station connected to the relay apparatus are not fixed, and may switch in different time periods. For example, as shown in FIG. 3, in this embodiment, the base station 1 serves as the master donor base station connected to the relay apparatus, and the base station 2 serves as the secondary donor base station connected to the relay apparatus. However, in an actual application, the base station 1 may also serve as the secondary donor base station connected to the relay apparatus, and the base station 2 may serve as the master donor base station connected to the relay apparatus.

Figure 5:
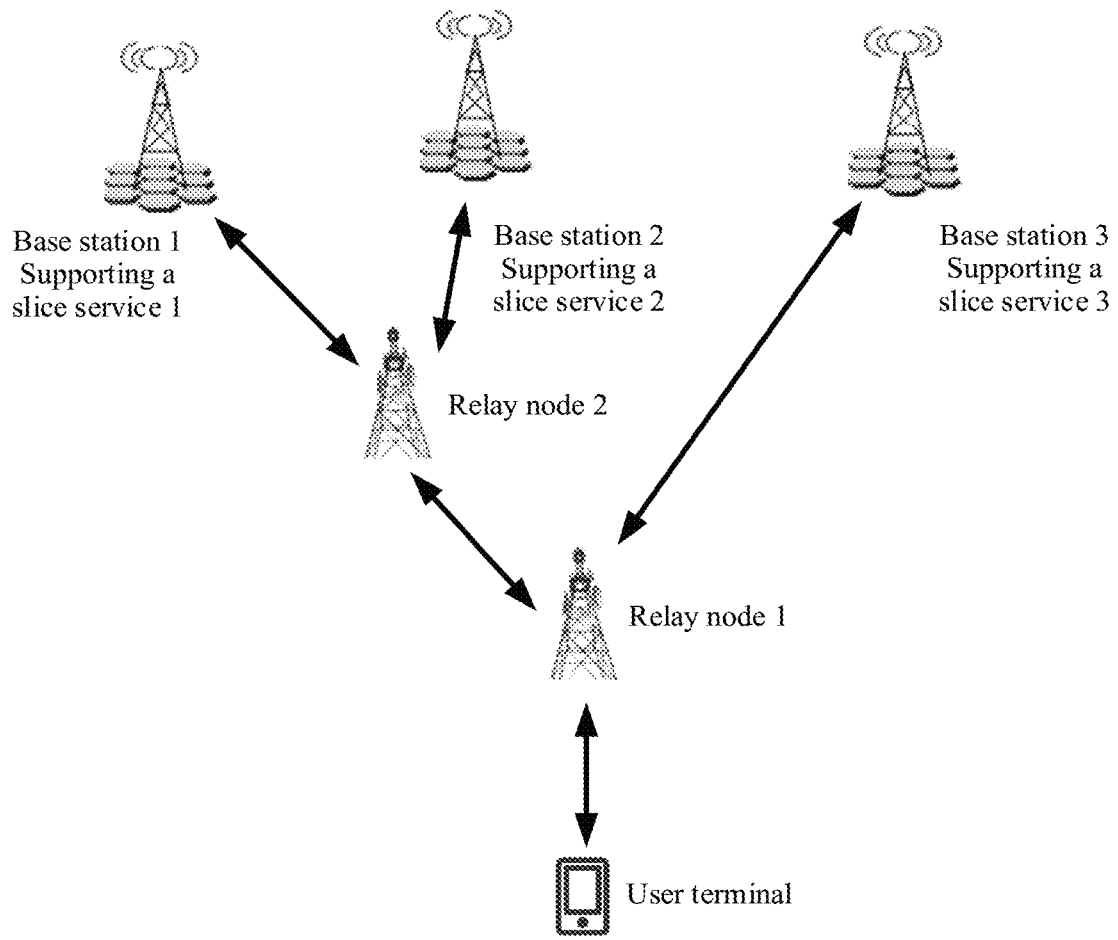
FIG. 5 is a diagram of another connection relationship between a user terminal, a relay node, and a base station according to an embodiment of this application.

In an implementation application, a connection relationship between the relay apparatus, the master donor base station, and the secondary donor base station may be alternatively shown in FIG. 5. In this application scenario, the relay apparatus is connected to a previous-hop relay apparatus, and the base stations are also connected to the previous-hop relay apparatus (in this case, it is assumed that the relay apparatus is a first relay apparatus, and the previous-hop relay apparatus connected to the relay apparatus is a second relay apparatus). In this case, a method for obtaining slice information according to this embodiment of this application may specifically be as follows.

In a possible implementation, the first relay apparatus receives a broadcast message broadcast by the second relay apparatus, and learns, from the broadcast message, of slice services supported by the base stations connected to the second relay apparatus.

In another possible implementation, if the master donor base station connected to the first relay apparatus can learn of slice information corresponding to another base station in a link in which the master donor base station is located, the relay apparatus may directly receive the system message or the RRC configuration message sent by the master donor base station, and then the relay apparatus learns, from the system message or the RRC configuration message, of the slice information of the slice service supported by the master donor base station and slice information that is corresponding to another base station and that is obtained by the master donor base station.

It may be understood that the foregoing two methods may both be used, or may be separately used. The methods are specifically implemented based on a user setting. For example, in the application scenario shown in FIG. 5, the base station 1 serves as the master donor base station connected to the relay apparatus 1, the base station 3 serves as the secondary donor base station connected to the relay apparatus 1, and the previous-hop relay apparatus connected to the relay apparatus 1 serves as the relay apparatus 2. In addition, the relay apparatus 2 is further connected to the base station 2. The base station 1 supports the slice 1, the base station 2 supports a slice 2, and the base station 3 supports a slice 3. In an actual application, the relay apparatus 1 may receive the broadcast message broadcast by the relay apparatus 2, and learn of the slice information of the slice service supported by the base station 1 and the slice information corresponding to the slice service supported by the base station 2. The relay apparatus then obtains, based on the foregoing description, the slice information corresponding to the secondary donor base station.

403: When the secondary donor base station meets a preset condition, the relay apparatus sends the broadcast message to a user terminal, where the broadcast message includes the first slice information and the second slice information.

If the relay apparatus obtains, by using the master donor base station, the slice information corresponding to the secondary donor base station, the relay apparatus needs to add the first slice information and the second slice information to the broadcast message when the master donor base station configures the secondary donor base station, to assist the relay apparatus in performing the transmission (in other words, the master donor base station indicates the relay apparatus to establish the connection to the secondary donor base station), and the relay apparatus sends the broadcast message to the user terminal.

Alternatively, when the relay apparatus and the secondary donor base station are in an inactive-connected state (that the first relay apparatus and the second access network device are in the inactive-connected state indicates that the two nodes store a context for establishing a link, where the context includes a link parameter configuration and a bearer parameter configuration; and when the connection between the relay apparatus and the secondary donor base station needs to be established, the connection is quickly established through a random access process, or without the random access process, the connection is directly established, based on a grant-free backhaul resource configured by the second access network device, in a state in which time alignment (TA) is maintained between the two nodes), the broadcast message includes the first slice information and the second slice information, and then the relay apparatus sends the broadcast message to the user terminal.

If the relay apparatus does not need to configure, by using the master donor base station, the secondary donor base station to assist the relay apparatus in performing the transmission (for example, if the relay apparatus directly stores a list of master and secondary donor base stations, and the relay apparatus may determine whether to establish the connection to the secondary donor base station based on the list of master and secondary donor base stations), the broadcast message includes the first slice information and the second slice information, and then the relay apparatus sends the broadcast message to the user terminal.

It may be understood that in the application scenario shown in FIG. 5, according to the foregoing described method, the relay apparatus 1 may alternatively broadcast the slice information corresponding to the base station 1 and slice information corresponding to the base station 3. A specific manner is not limited herein.

In this embodiment, in all different application scenarios, the relay apparatus may obtain slice information corresponding to an access network device connected to the relay apparatus, and then broadcast the slice information to the user terminal, so that the user terminal can obtain slice information of slice services supported by a plurality of base stations, thereby ensuring that the user terminal may receive services corresponding to a plurality of slice services in a network.

In this embodiment of this application, when the user terminal sends first indication information to a base station, in a multi-hop multi-connection application scenario, the relay apparatus may perform, based on the slice information of the slice service supported by the relay apparatus, corresponding transparent transmission on the first indication information sent by the user terminal. For details, refer to FIG. 6, including the following steps.

601: The relay apparatus receives the first indication information sent by the user terminal.

In a process (for example, the random access process) in which a connection is established between the user terminal and the network or after the connection is established between the user terminal and the network, the user terminal may send, to the relay apparatus, a media access control (MAC) message or an RRC message including the first indication information. The first indication information includes at least one of a slice identity ID of the slice service, a service type of the slice service, a slice type of the slice service, and an ID of the slice type.

602: The relay apparatus sends the first indication information to the access network device, where the access network device is connected to the relay apparatus.

As specified in a 3rd Generation Partnership Project (3GPP) protocol, the relay apparatus is in an L2 (layer 2) relay or an L3 (layer 3) relay. A difference between such two types of relays is that a relay apparatus in the L3 relay has a layer 3 protocol stack, namely, an RRC protocol stack, and therefore, the relay apparatus in the L3 relay may generate an RRC message, process an RRC message sent by the user terminal, and perform a function such as a mobility control function; and a relay apparatus in the L2 relay forwards RRC messages sent by the user terminal and a donor base station, and the relay apparatus in the L2 relay does not have a capability of processing the RRC message sent by the user terminal. Therefore, a specific operation manner in which the relay apparatus forwards the first indication information based on a device function of the relay apparatus and the first indication information is implemented in the following manners.

In a possible implementation, the relay apparatus is the relay apparatus in the L3 relay, to be specific, the relay apparatus may parse the first indication information sent by the user terminal. In this case, the relay apparatus may forward the first indication information in the following specific several manners.

1. The relay apparatus generates a data packet that can be parsed and identified by an upstream node (the upstream node may include a relay apparatus or a base station). The data packet includes all content in the first indication information. The relay apparatus then forwards the data packet to the corresponding upstream node based on the slice information that has been learned of by the relay apparatus. For example, in the application scenario shown in FIG. 3, the base station 1 supports the slice service 1, the base station 2 supports the slice service 2, and the base station 3 supports the slice service 3. The relay node 2 is connected to the base station 1 and the base station 2, and the relay node 1 (namely, the relay apparatus in this embodiment) is connected to the base station 3 and the relay node 2. The first indication information sent by the user terminal to the network includes slice information of the slice service 2 and slice information of the slice service 3. The base station 1 is the master donor base station connected to the relay node 1, and the base station 3 is the secondary donor base station connected to the relay node 1. In this case, after the relay node 1 receives the first indication information sent by the user terminal, the generated data packet includes request information corresponding to the slice service 2 and the slice service 3, the data packet is sent to the base station 3 and the relay node 2, and the relay node 2 then sends the data packet obtained through corresponding processing performed by the relay node 2 to the base station 2.

2. The relay apparatus generates a data packet that can be parsed and identified by an upstream node. The data packet includes some content in the first indication information. The relay apparatus then forwards the data packet to the corresponding upstream node based on the slice information that has been learned of by the relay apparatus. For example, in the application scenario shown in FIG. 3, the relay node 1 may generate two data packets. A data packet 1 includes slice information of the slice service 2 in the first indication information. Data 2 includes slice information of the slice service 3 in the first indication information. The relay node 1 then sends the data packet 1 to the relay node 2, and the relay node 2 generates another data packet. The another data packet includes request information corresponding to the slice service 2, and the relay node 2 then sends the another data packet to the base station 2. The relay node 1 sends the data packet 2 to the base station 3.

In another possible implementation, the relay apparatus is the relay apparatus in the L2 relay, to be specific, the relay apparatus cannot parse the first indication information sent by the user terminal. In this case, the relay apparatus may forward the first indication information in the following specific several manners.

1. The relay apparatus directly forwards, to all upstream nodes connected to the relay apparatus, the first indication information sent by the user terminal. For example, in the application scenario shown in FIG. 3, if both the relay node 1 and the relay node 2 are relay apparatuses in the L2 relay, the relay node 1 directly forwards, to the relay node 2 and the base station 3, the first indication information sent by the user terminal. After receiving the first indication information sent by the user terminal, the relay node 2 forwards the first indication information to the base station 1 and the base station 2.

2. The relay apparatus directly forwards, to the master donor base station connected to the relay apparatus, the first indication information sent by the user terminal, and then receives feedback information sent by the master donor base station. The feedback information is used to indicate the slice service requested in the first indication information. Finally, the relay apparatus forwards the feedback information to an upstream node connected to the relay apparatus. For example, in the application scenario shown in FIG. 3, if both the relay node 1 and the relay node 2 are relay apparatuses in the L2 relay, the relay node 1 forwards, to the base station 1, the first indication information sent by the user terminal, the base station 1 parses the first indication information sent by the user terminal, and then feeds back, to the relay node, the slice service 2 and the slice service 3 requested in the first indication information, and the relay apparatus forwards the feedback information to all upstream nodes connected to the relay apparatus.

3. Because the relay apparatus cannot parse the RRC message, the relay apparatus and the user terminal may agree in advance that the user terminal adds information that can be identified by the relay apparatus to the first indication information, to indicate the slice service requested by the user terminal. The information that can be identified by the relay apparatus may include at least one of a MAC CE or physical layer signaling. For example, in the application scenario shown in FIG. 3, if both the relay node 1 and the relay node 2 are relay apparatuses in the L2 relay, when the relay node 1 and the user terminal may agree that the user terminal sends the first indication information by using the RRC message, the user terminal may indicate, by using the MAC CE, the slice service requested in the first indication information, and then the relay apparatus correspondingly forwards, based on the slice service indicated by using the MAC CE information, the first indication information sent by the user terminal.

Figure 7:
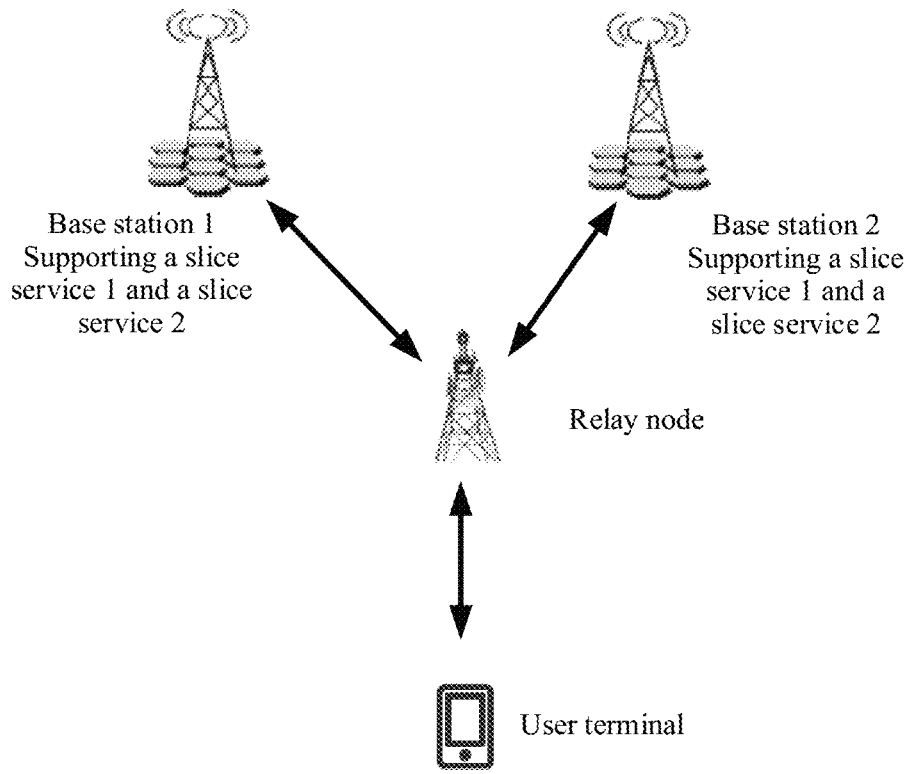
FIG. 7 is a diagram of another connection relationship between a user terminal, a relay node, and a base station according to an embodiment of this application.

In an actual application, the multi-hop multi-connection scenario may alternatively be an application scenario shown in FIG. 7. In the application scenario, if upstream nodes connected to the relay apparatus support same slice services, the relay apparatus may forward, in the following several manners, the first indication information sent by the user terminal.

In a possible implementation, the relay apparatus forwards, as specified in the protocol, the first indication information to the master donor base station connected to the relay apparatus, or forwards the first indication information in an upstream node link in which the master donor base station is located. It is assumed that the application scenario in FIG. 7 includes the base station 1 and the base station 2, the base station 1 and the base station 2 support both the slice service 1 and the slice service 2, the relay node is connected to the base station 1 and the base station 2, and the base station 1 is the master donor base station connected to the relay node. When the user terminal sends the first indication information (the first indication information is used to indicate the slice service 1 requested by the user terminal) to the relay node, the relay node forwards the first indication information to the base station 1.

In another possible implementation, the master donor base station or a core network device connected to the relay apparatus indicates the relay apparatus to forward the first indication information to one or more of the upstream nodes connected to the relay apparatus. For example, in the application scenario in FIG. 7, if configuration information sent by the base station 1 to the relay node is used to indicate the relay node to forward the received first indication information to the base station 2, the relay node forwards the first indication information to the base station 2 when receiving the first indication information sent by the user terminal.

In another possible implementation, the master donor base station or a core network device connected to the relay apparatus indicates the relay apparatus to forward the first indication information to any one of the upstream nodes connected to the relay apparatus. For example, in the application scenario in FIG. 7, if configuration information sent by the base station 1 to the relay node is used to indicate the relay node to forward the first indication information at random, when the relay node receives the first indication information sent by the user terminal, the relay node may select to forward the first indication information to both the base station 1 and the base station 2, select to forward the first indication information to the base station 1, or select to forward the first indication information to the base station 2.

In another possible implementation, the master donor base station or a core network device connected to the relay apparatus indicates the relay apparatus to forward specific first indication information to a specific upstream node. For example, in the application scenario in FIG. 7, configuration information sent by the base station 1 to the relay node is used to indicate the relay node to forward, to the base station 1, the first indication information used to request the slice service 1, and forward, to the base station 2, the first indication information used to request the slice service 2. In this way, if the first indication information received by the relay node is used to request the slice service 2, the relay node forwards the first indication information to the base station 2. If the first indication information received by the relay node is used to request the slice service 1, the relay node forwards the first indication information to the base station 1.

It may be understood that, in the actual application, in an integrated access and backhaul (IAB) network shown in FIG. 1, a total quantity of available resources in the network that are used for an access link and a backhaul link does not change. However, resource division for the access link and the backhaul link may be dynamically changed, so that an instant requirement of the user terminal for cross-network communication is met. In this case, the relay apparatus needs to allocate a random access resource for the slice service supported by the relay apparatus. For details, refer to FIG. 8.

801: The relay apparatus obtains the slice information of the slice service supported by the relay apparatus.

The relay apparatus obtains slice information of at least one slice service supported by the access network device connected to the relay apparatus, and the slice information is integrated to determine the slice service supported by the relay apparatus.

For example, as shown in FIG. 7, slice information that is of slice services supported by the base station 1 and that is obtained by the relay node is slice information of the slice 1 and the slice 2, and slice information that is of slice services supported by the base station 2 and that is obtained by the relay node is slice information of the slice 1 and the slice 2. In this case, the slice services supported by the relay node are the slice 1 and the slice 2.

802: The relay apparatus allocates the random access resource for the slice service.

On the premise that a quantity of random resources allocated by the relay apparatus for the slice service does not exceed a total quantity of random access resources allocated by the relay apparatus, the relay apparatus allocates the random access resource for the slice service.

That the relay apparatus allocates the random access resource for the slice service may specifically include the following operations.

Figure 9:
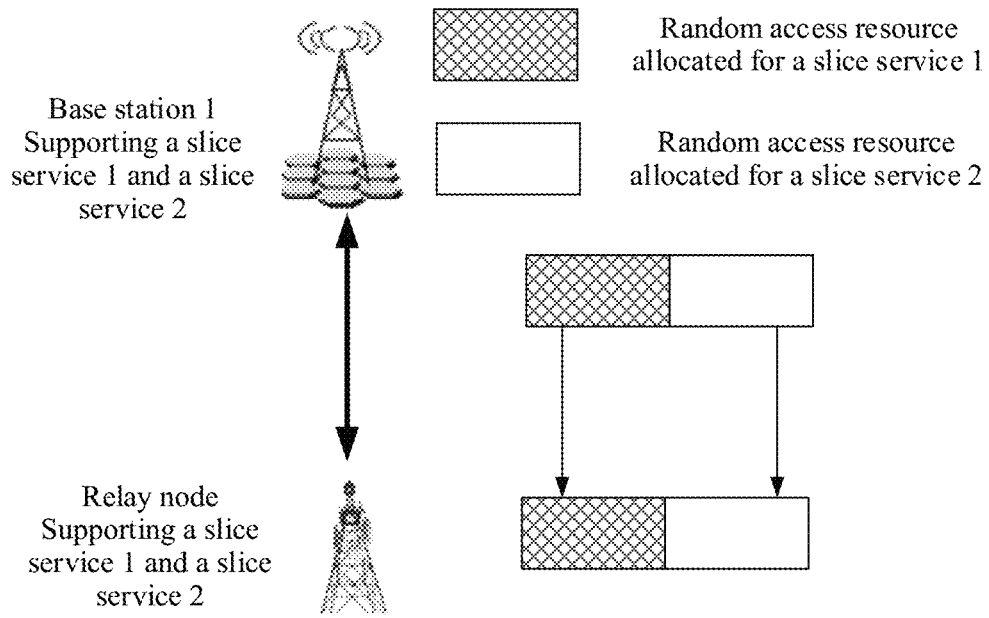
FIG. 9 is a schematic diagram of an implementation of resource configuration according to an embodiment of this application.

In a possible implementation, after the relay apparatus determines the slice service based on the first random access resource, the relay apparatus allocates a second random access resource for the slice service. Both location information and a quantity of second random access resources and location information and a quantity of first random access resources are the same. To be specific, as shown in FIG. 9, the base station 1 allocates random resources for the slice service 1 and the slice service 2. It is assumed that a resource location corresponding to the slice service 1 is a location A, and a quantity of resources allocated for the slice service 1 is 4; a resource location corresponding to the slice service 2 is a location B, and a quantity of resources allocated for the slice service 2 is 5. In this way, when the relay node allocates the random resources for the slice service 1 and the slice service 2, the resource location corresponding to the slice service 1 is the location A, and the quantity of resources allocated for the slice service 1 is 4; the resource location corresponding to the slice service 2 is the location B, and the quantity of resources allocated for the slice service 2 is 5.

Figure 10:
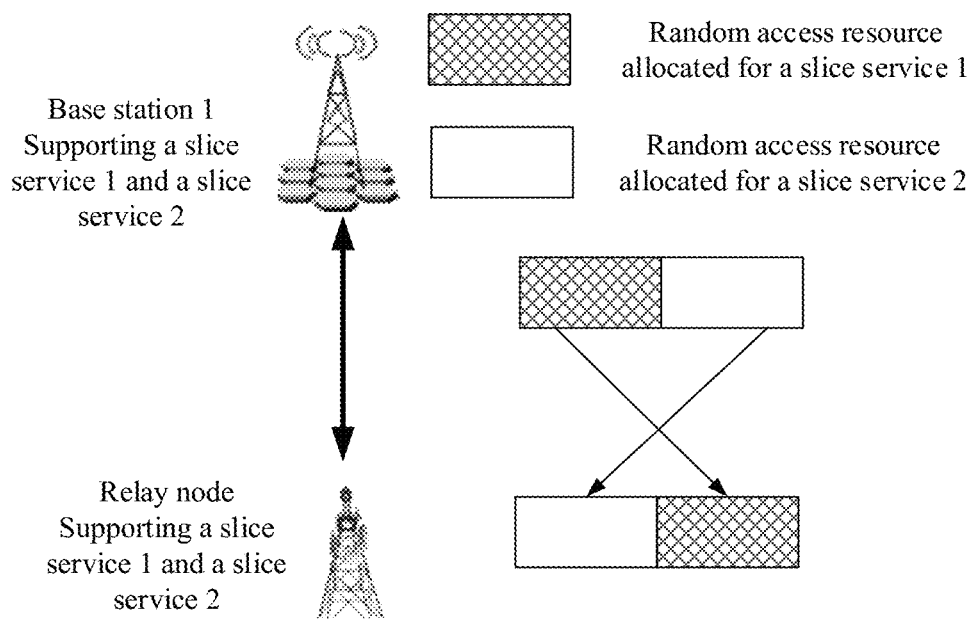
FIG. 10 is a schematic diagram of another implementation of resource configuration according to an embodiment of this application.

In another possible implementation, after the relay apparatus determines the slice service based on the first random access resource, the relay apparatus allocates a second random access resource for the slice service. A quantity of second random access resources is equal to a quantity of first random access resources. To be specific, as shown in FIG. 10, the base station 1 allocates random resources for the slice service 1 and the slice service 2. It is assumed that a resource location corresponding to the slice service 1 is a location A, and a quantity of resources allocated for the slice service 1 is 4; a resource location corresponding to the slice service 2 is a location B, and a quantity of resources allocated for the slice service 2 is 5. In this way, when the relay node allocates the random resources for the slice service 1 and the slice service 2, the resource location corresponding to the slice service 1 is the location B, and the quantity of resources allocated for the slice service 1 is 4; the resource location corresponding to the slice service 2 is the location A, and the quantity of resources allocated for the slice service 2 is 5.

It may be understood that the location information of the slice service 1 and the location information of the slice service 2 may switch as shown in FIG. 10, or may be other locations. For example, the location information of the slice service 1 is a location C, and the location information of the slice service is a location D. A specific manner is not limited herein.

Figure 11:
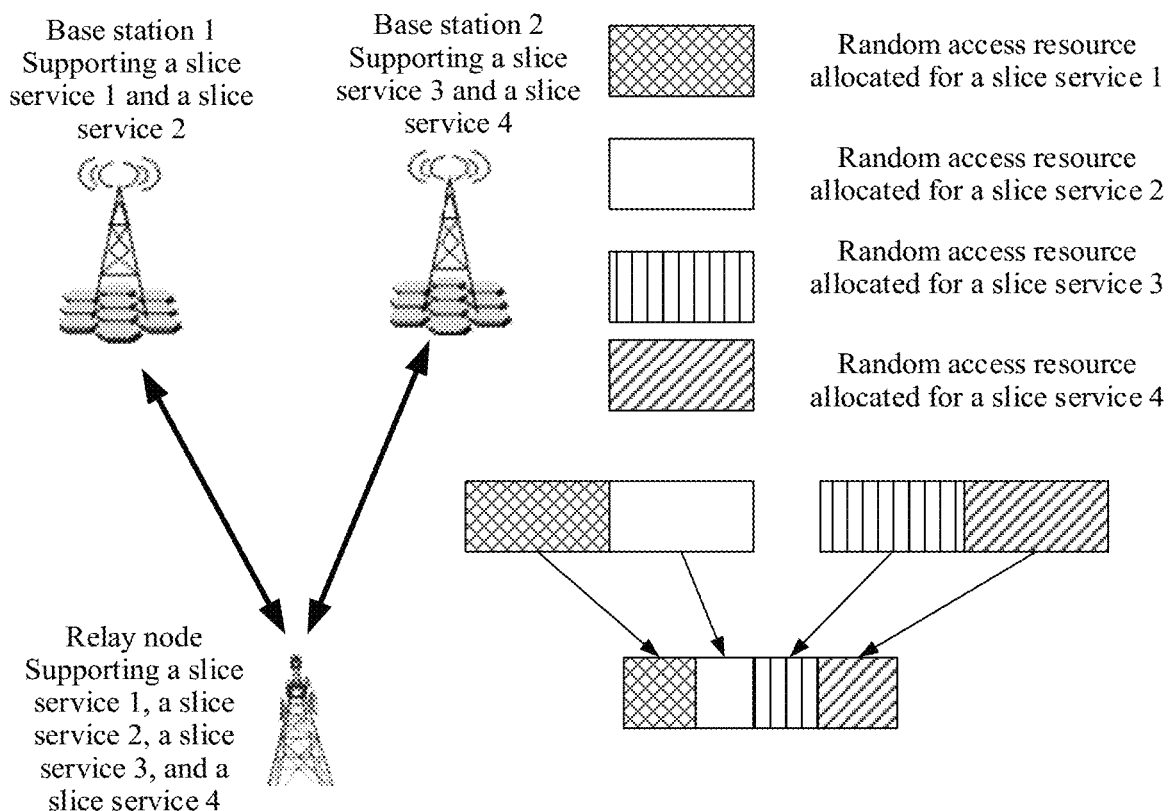
FIG. 11 is a schematic diagram of another implementation of resource configuration according to an embodiment of this application.

In another possible implementation, after the relay apparatus determines the slice service based on the first random access resource, the relay apparatus allocates corresponding random access resources for slice services, to generate the second random access resources. A total quantity of resources allocated for all slice services does not exceed a total quantity of random access resources allocated by the relay apparatus. In addition, the random access resources corresponding to the slice services do not overlap. As shown in FIG. 11, the relay node is separately connected to two base stations. The base station 1 supports the slice service 1 and the slice service 2, and the base station 2 supports the slice service 3 and the slice service 4. A resource location corresponding to the slice service 1 is a location A, and a quantity of resources allocated for the slice service 1 is 4. A resource location corresponding to the slice service 2 is a location B, and a quantity of resources allocated for the slice service 2 is 5. A resource location corresponding to the slice service 3 is a location C, and a quantity of resources allocated for the slice service 3 is 4. A resource location corresponding to the slice service 1 is a location D, and a quantity of resources allocated for the slice service 4 is 5. An allocation situation in which the relay node allocates random access resources for the slice service 1 to slice service 4 is as follows: The quantity of resources allocated for the slice service 1 is 1; the quantity of resources allocated for the slice service 2 is 2; the quantity of resources allocated for the slice service 3 is 1; the quantity of resources allocated for the slice service 4 is 2. Resource locations corresponding to slice services do not overlap, but specific location information is not limited.

Figure 12:
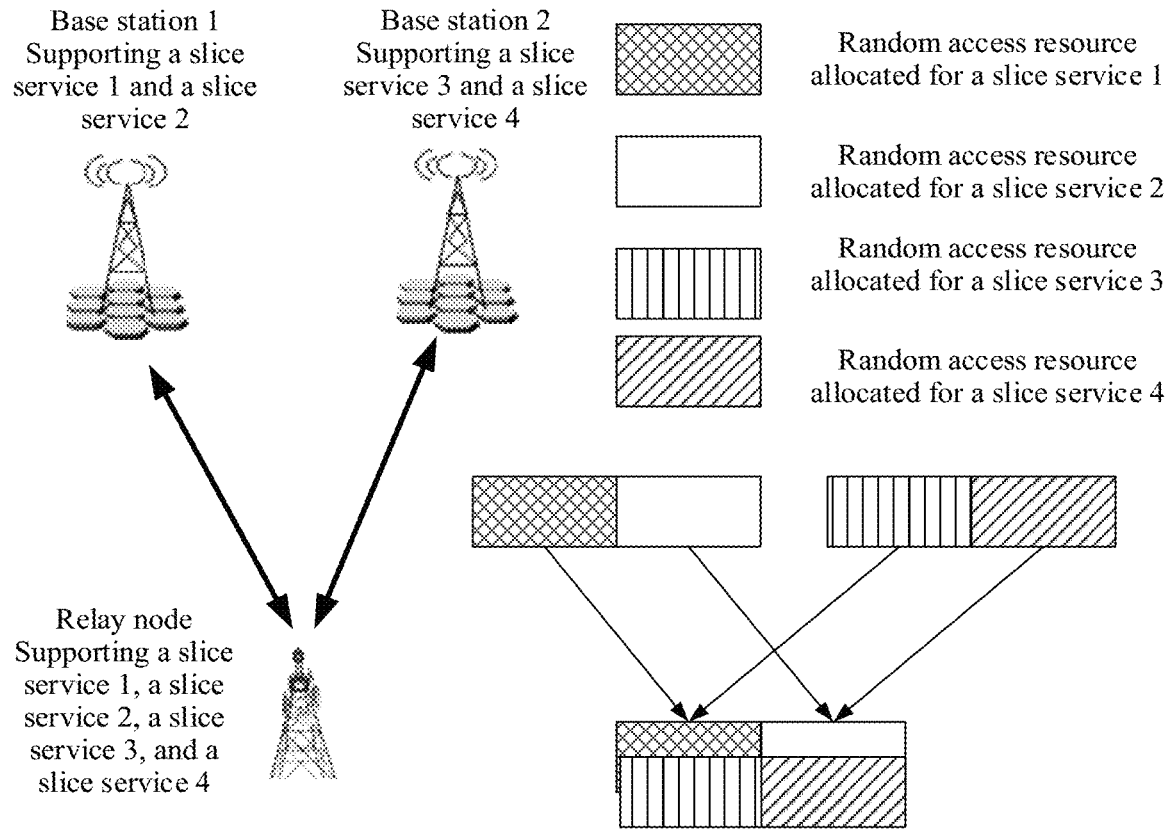
FIG. 12 is a schematic diagram of another implementation of resource configuration according to an embodiment of this application.

In another possible implementation, after the relay apparatus determines the slice service based on the first random access resource, the relay apparatus allocates corresponding random access resources for slice services, to generate the second random access resources. A total quantity of resources allocated for all slice services does not exceed a total quantity of random access resources allocated by the relay apparatus. In addition, the random access resources corresponding to slice services having same attributes may overlap (that is, may be reused). As shown in FIG. 12, the relay node is separately connected to two base stations. The base station 1 supports the slice service 1 and the slice service 2, and the base station 2 supports the slice service 3 and the slice service 4. A resource location corresponding to the slice service 1 is a location A, and a quantity of resources allocated for the slice service 1 is 4. A resource location corresponding to the slice service 2 is a location B, and a quantity of resources allocated for the slice service 2 is 5. A resource location corresponding to the slice service 3 is a location C, and a quantity of resources allocated for the slice service 3 is 4. A resource location corresponding to the slice service 1 is a location D, and a quantity of resources allocated for the slice service 4 is 5. If an attribute of the slice service 1 is the same as an attribute of the slice service 3, and an attribute of the slice service 2 is the same as an attribute of the slice service 4, the allocation situation in which the relay node allocates the random access resource for the slice service 1 to slice service 4 is as follows: The quantity of resources allocated for the slice service 1 is 4, and the resource location corresponding to the slice service 1 is the location A; the quantity of resources allocated for the slice service 2 is 5, and the resource location corresponding to the slice service 2 is the location B; the quantity of resources allocated for the slice service 3 is 4, and the resource location corresponding to the slice service 3 is the location A; the quantity of resources allocated for the slice service 4 is 5, and the resource location corresponding to the slice service 4 is the location B.

It may be understood that, in this embodiment, attributes of the slice services are used to indicate characteristics of the slice services, specifically indicating that a service type of the slice service may be a factor such as a specific requirement based on which the resources are allocated for the slice service. A specific allocation situation is decided by a user, and is not limited herein.

803: The relay apparatus sends the random access resource to the user terminal.

The relay apparatus sends random access resource allocation information to the user terminal, so that the user terminal selects, based on the random access resources allocated by the relay apparatus, a random access resource allocated for a current slice service.

In this embodiment, the relay apparatus accurately forwards, to a corresponding base station, the request information of the slice service sent by the user terminal, thereby ensuring service continuity for the user terminal.

It may be understood that, in this embodiment of this application, the solutions shown in FIG. 2, FIG. 4, FIG. 6, and FIG. 8 may be implemented independently, or may be combined to form a complete data transmission solution for implementation. A specific manner is not limited herein.

The foregoing describes the method for obtaining slice information, the method for processing the first indication information, and the resource configuration method according to the embodiments of this application. The following describes relay apparatuses in the solutions.

Figure 13:
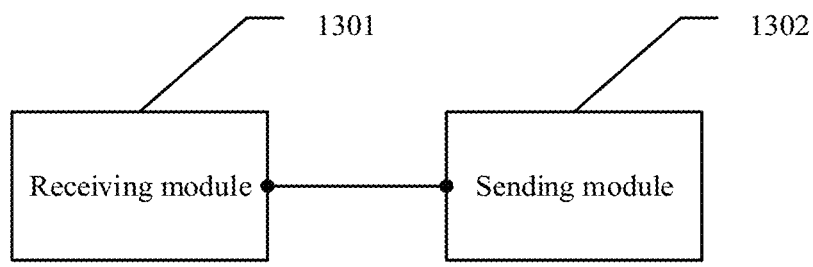
FIG. 13 is a schematic diagram of an embodiment of a relay apparatus according to an embodiment of this application.

For details, refer to FIG. 13. FIG. 13 shows an embodiment of a relay apparatus according to an embodiment of this application. The relay apparatus is connected to at least two access network devices. In this embodiment, the first relay apparatus is used for description. Other relay apparatuses also have functions of the first relay apparatus. The relay apparatus includes:

a receiving module 1301, configured to: obtain first slice information of at least one slice service supported by the first access network device; and obtain second slice information of at least one slice service supported by a second access network device; and a sending module 1302, configured to send a broadcast message to a user terminal, where the broadcast message includes the first slice information and the second slice information.

Optionally, if the first access network device is a master access network device connected to the first relay apparatus, and the second access network device is a secondary access network device connected to the first relay apparatus, the first slice information is carried in an RRC configuration message or a system message, and the RRC configuration message or the system message is sent by the first access network device to the first relay apparatus; and the second slice information is carried in a first RRC message, a second RRC message, or a third RRC message, the first RRC message is sent by the first access network device to the first relay apparatus, the second RRC message is forwarded by the first access network device to the first relay apparatus after being sent by the second access network device to the first access network device, and the third RRC message is sent by the second access network device to the first relay apparatus.

In this embodiment, the RRC message may be the RRC configuration message, or may be the system message.

Optionally, if the first access network device is the master access network device connected to the first relay apparatus, and the second access network device is the secondary access network device connected to the first relay apparatus, the broadcast message includes the first slice information and the second slice information when the first relay apparatus and the second access network device meet a preset condition; and the preset condition includes at least one of the following:

the first access network device configures the second access network device to transmit data to the first relay apparatus; and the first relay apparatus and the second access network device are in an inactive-connected state.

Optionally, the receiving module 1301 is configured to receive third slice information broadcast by a second relay apparatus, where the third slice information is slice information of at least one slice service supported by the second relay apparatus; and the broadcast message further includes the third slice information.

Figure 4:
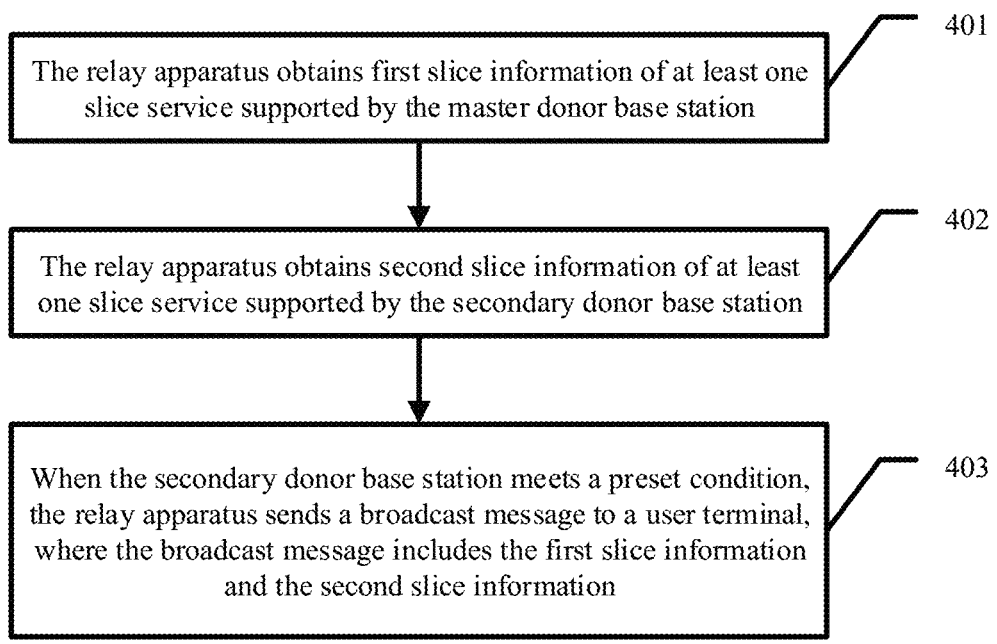
FIG. 4 is a schematic diagram of another embodiment of a method for obtaining slice information according to an embodiment of this application.

In this embodiment, the receiving module 1301 may be further configured to perform the data receiving steps performed by the first relay apparatus in FIG. 2 or FIG. 4. The sending module 1302 may be further configured to perform the data sending steps performed by the first relay apparatus in FIG. 2 or FIG. 4.

In this embodiment, the receiving module 1301 is configured to obtain slice information corresponding to an access network device connected to the relay apparatus, and then the sending module 1302 is configured to broadcast the slice information to the user terminal, so that the user terminal can obtain slice information of slice services supported by a plurality of access network devices, thereby ensuring that the user terminal receives services corresponding to a plurality of slice services in a network.

Figure 14:
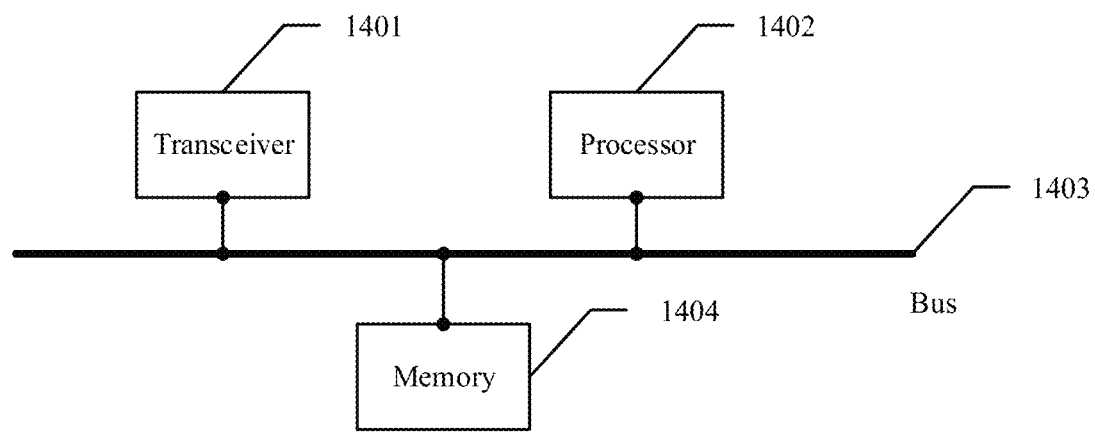
FIG. 14 is a schematic diagram of another embodiment of a relay apparatus according to an embodiment of this application.

For details, refer to FIG. 14. FIG. 14 shows an embodiment of a relay apparatus according to an embodiment of this application. The relay apparatus is connected to at least two access network devices. In this embodiment, the first relay apparatus is used for description. Other relay apparatuses also have functions of the first relay apparatus. The relay apparatus includes:

a transceiver 1401, a processor 1402, and a bus 1403, where the transceiver 1401 is connected to the processor 1402 by using the bus 1403; and the bus 1403 may be a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 14, but this does not mean that there is only one bus or only one type of bus.

The processor 1402 may be a central processing unit (CPU), a network processor (NP), or a combination of a CPU and an NP.

The processor 1402 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

Referring to FIG. 14, the relay apparatus may further include a memory 1404. The memory 1404 may include a volatile memory, for example, a random access memory (RAM). Alternatively, the memory may include a non-volatile memory, for example, a flash memory, a hard disk drive (HDD), or a solid-state drive (SSD). Alternatively, the memory 1404 may include a combination of the foregoing types of memories.

Optionally, the memory 1404 may be further configured to store a program instruction. The processor 1402 is configured to invoke the program instruction stored in the memory 1404, and can perform one or more steps in the embodiments shown in FIG. 2 and FIG. 4, or an optional implementation in the embodiments shown in FIG. 2 and FIG. 4, to implement a function of performing an operation of the relay apparatus in the foregoing methods.

The transceiver 1401 is configured to:

obtain first slice information of at least one slice service supported by the first access network device; obtain second slice information of at least one slice service supported by a second access network device; and send a broadcast message to a user terminal, where the broadcast message includes the first slice information and the second slice information.

The processor 1402, the memory 1404, and the transceiver 1401 are configured to perform the steps in FIG. 2 and FIG. 4.

In this embodiment, the transceiver 1401 is configured to: obtain slice information corresponding to an access network device connected to the relay apparatus, and then broadcast the slice information to the user terminal, so that the user terminal can obtain slice information of slice services supported by a plurality of base stations, thereby ensuring that the user terminal receives services corresponding to a plurality of slice services in a network.

Figure 6:
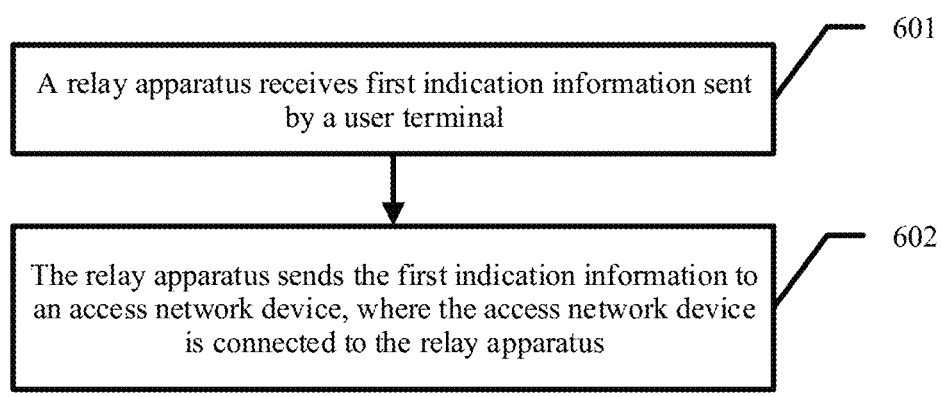
FIG. 6 is a schematic diagram of an embodiment of a data processing method according to an embodiment of this application.
Figure 15:
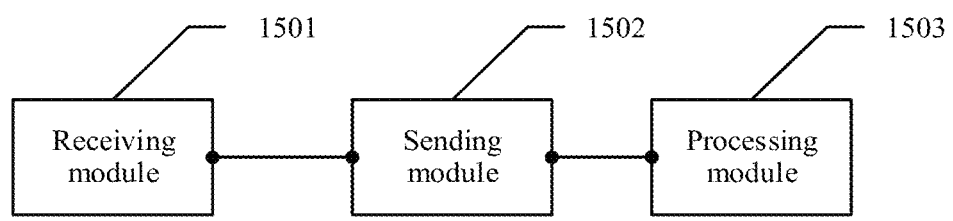
FIG. 15 is a schematic diagram of another embodiment of a relay apparatus according to an embodiment of this application.

For details, refer to FIG. 15. FIG. 15 shows an embodiment of a relay apparatus according to an embodiment of this application. The relay apparatus is connected to at least two access network devices. In this embodiment, the relay apparatus in the embodiment shown in FIG. 6 is used for description. The relay apparatus includes:

a receiving module 1501, configured to receive first indication information sent by a user terminal, where the first indication information is used to indicate a slice service requested by the user terminal; and a sending module 1502, configured to send the first indication information to a target access network device in the at least two access network devices.

Optionally, the relay apparatus further includes:

a processing module 1503, configured to generate a data packet that can be identified by the target access network device, where the data packet includes the first indication information.

Optionally, the processing module 1503 is configured to: determine the target access network device based on the first indication information and slice information of a slice service supported by the relay apparatus; and generate a target data packet corresponding to the target access network device, where the target data packet includes the first indication information, where the sending module 1502 is configured to send the target data packet to the target access network device.

Optionally, the sending module 1502 is configured to forward the first indication information to the at least two access network devices.

Optionally, the sending module 1502 is configured to forward the first indication information to a master access network device in the at least two access network devices that is connected to the relay apparatus;

the receiving module 1501 is configured to receive feedback information sent by the master access network device, where the feedback information is used to indicate the slice service requested in the first indication information; and the sending module 1502 is configured to forward the feedback information to an access network device other than the master access network device in the at least two access network devices.

Optionally, the receiving module 1501 is configured to receive second indication information sent by the user terminal, where the second indication information is used to indicate the slice service requested in the first indication information; and the sending module 1502 is configured to forward the first indication information to the at least two access network devices based on the second indication information.

Optionally, the sending module 1502 is configured to: forward the first indication information to the master access network device in the at least two access network devices that is connected to the relay apparatus, or forward the first indication information to a transmission link in which the master access network device is located, where the master access network device serves as the target access network device; or forward the first indication information to the at least two access network devices based on configuration information, where the configuration information is used to indicate the relay apparatus to forward the first indication information to some access network devices in the at least two access network devices, and the some access network devices serve as the target access network devices; or the configuration information is used to indicate the relay apparatus to forward, when the first indication information is used to indicate a specific slice service requested by the user terminal, the first indication information to a specific access network device in the access network devices that corresponds to the specific slice service, and the specific access network device serves as the target access network device.

In this embodiment, the receiving module 1501 may be further configured to perform the data receiving steps performed by the relay apparatus in FIG. 6. The sending module 1502 may be further configured to perform the data sending steps performed by the relay apparatus in FIG. 6. The processing module 1503 may be further configured to perform the data processing steps performed by the relay apparatus in FIG. 6.

In this embodiment, the relay apparatus accurately forwards, to a corresponding access network device, the first indication information sent by the user terminal, thereby ensuring service continuity for the user terminal.

Figure 16:
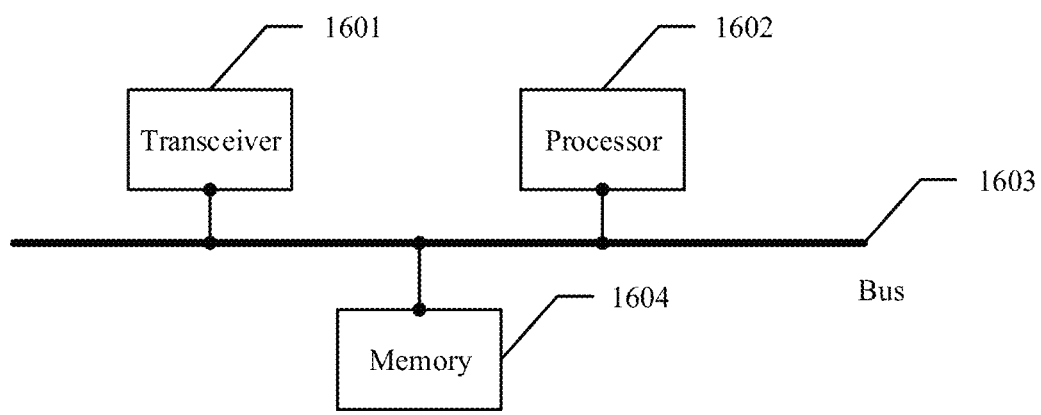
FIG. 16 is a schematic diagram of another embodiment of a relay apparatus according to an embodiment of this application.

For details, refer to FIG. 16. FIG. 16 shows an embodiment of a relay apparatus according to an embodiment of this application. The relay apparatus is connected to at least two access network devices. In this embodiment, the relay apparatus in the embodiment shown in FIG. 6 is used for description. The relay apparatus includes:

a transceiver 1601, a processor 1602, and a bus 1603, where the transceiver 1601 is connected to the processor 1602 by using the bus 1603; and the bus 1603 may be a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 16, but this does not mean that there is only one bus or only one type of bus.

The processor 1602 may be a central processing unit (CPU), a network processor (NP), or a combination of a CPU and an NP.

The processor 1602 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

Referring to FIG. 16, the relay apparatus may further include a memory 1604. The memory 1604 may include a volatile memory, for example, a random access memory (RAM). Alternatively, the memory may include a non-volatile memory, for example, a flash memory, a hard disk drive (HDD), or a solid-state drive (SSD). Alternatively, the memory 1604 may include a combination of the foregoing types of memories.

Optionally, the memory 1604 may be further configured to store a program instruction. The processor 1602 is configured to invoke the program instruction stored in the memory 1604, and can perform one or more steps in the embodiment shown in FIG. 6, or an optional implementation in the embodiment shown in FIG. 6, to implement a function of performing an operation of the relay apparatus in the foregoing methods.

The transceiver 1601 is configured to:

receive first indication information sent by a user terminal, where the first indication information is used to indicate a slice service requested by the user terminal; and send the first indication information to a target access network device in the at least two access network devices.

The processor 1602, the memory 1604, and the transceiver 1601 are further configured to perform the steps in FIG. 6.

In this embodiment, the relay apparatus accurately forwards, to a corresponding access network device, the first indication information sent by the user terminal, thereby ensuring service continuity for the user terminal.

Figure 8:
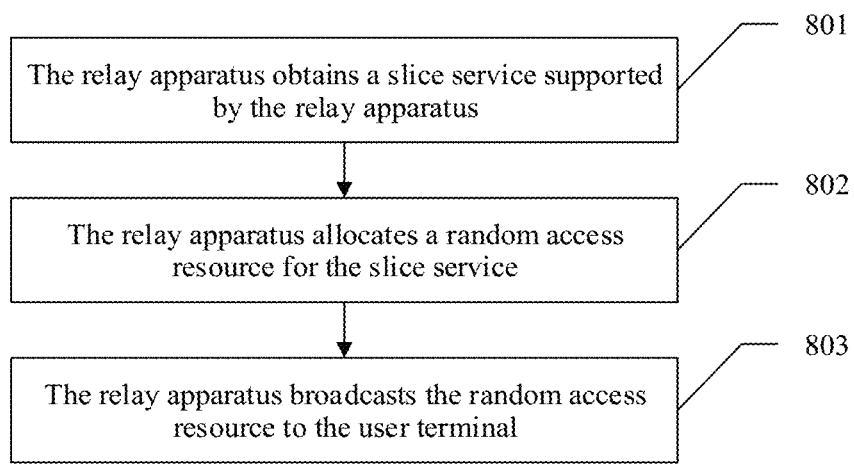
FIG. 8 is a schematic diagram of an embodiment of a resource configuration method according to an embodiment of this application.
Figure 17:
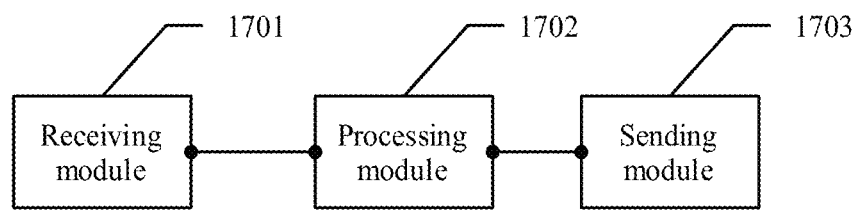
FIG. 17 is a schematic diagram of another embodiment of a relay apparatus according to an embodiment of this application.

For details, refer to FIG. 17. FIG. 17 shows an embodiment of a relay apparatus according to an embodiment of this application. In this embodiment, the relay apparatus in the embodiment shown in FIG. 8 is used for description. The relay apparatus includes:

an obtaining module 1701, configured to obtain slice information of a slice service supported by the relay apparatus;

a processing module 1702, configured to allocate a random access resource for the slice service; and a sending module 1703, configured to broadcast the random access resource to a user terminal.

Optionally, the processing module 1702 is configured to allocate reused random access resources for slice services having same service attributes.

Optionally, the processing module 1702 is configured to allocate a corresponding random access resource for each of at least one slice service supported by the relay apparatus.

Optionally, the obtaining module 1701 is configured to obtain random access resource allocation information used for an access network device, where the access network device is connected to the relay apparatus, and the random access resource allocation information is used to indicate a random access resource allocation ratio between different slice services supported by the access network device; and the processing module 1702 is configured to allocate, based on the random access resource allocation ratio, the random access resource for the at least one slice service supported by the relay apparatus.

In this embodiment, the obtaining module 1701 may be further configured to perform the data obtaining steps performed by the relay apparatus in FIG. 8. The processing module 1702 may be further configured to perform the data processing steps performed by the relay apparatus in FIG. 8. The sending module 1703 may be further configured to perform the data sending steps performed by the relay apparatus in FIG. 8.

In this embodiment, the relay apparatus allocates the random access resource for the slice service supported by the relay apparatus, and sends the random access resource to the user terminal, so that the user terminal can accurately select the corresponding random access resource for data transmission, thereby ensuring service continuity for the user terminal.

Figure 18:
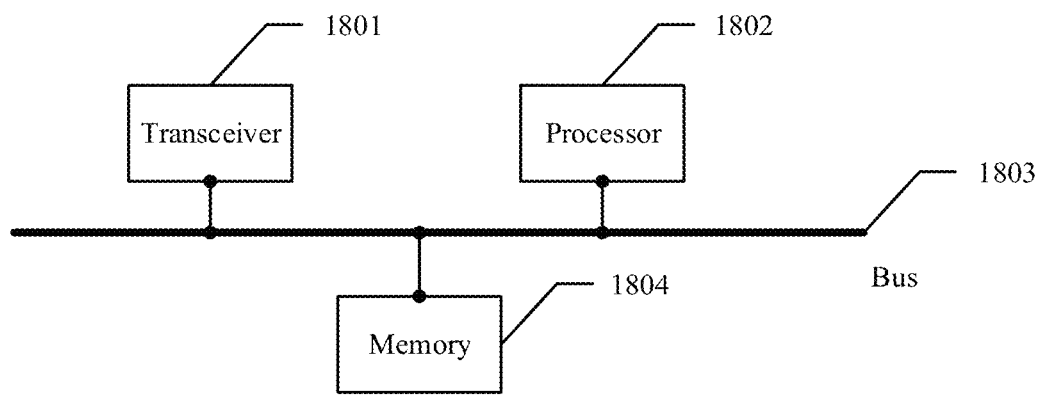
FIG. 18 is a schematic diagram of another embodiment of a relay apparatus according to an embodiment of this application.

For details, refer to FIG. 18. FIG. 18 shows an embodiment of a relay apparatus according to an embodiment of this application. In this embodiment, the relay apparatus in the embodiment shown in FIG. 8 is used for description. The relay apparatus includes:

a transceiver 1801, a processor 1802, and a bus 1803, where the transceiver 1801 is connected to the processor 1802 by using the bus 1803; and the bus 1803 may be a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 18, but this does not mean that there is only one bus or only one type of bus.

The processor 1802 may be a central processing unit (CPU), a network processor (NP), or a combination of a CPU and an NP.

The processor 1802 may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof.

Referring to FIG. 18, the relay apparatus may further include a memory 1804. The memory 1804 may include a volatile memory, for example, a random access memory (RAM). Alternatively, the memory may include a nonvolatile memory, for example, a flash memory, a hard disk drive (HDD), or a solid-state drive (SSD). Alternatively, the memory 1804 may include a combination of the foregoing types of memories.

Optionally, the memory 1804 may be further configured to store a program instruction. The processor 1802 is configured to invoke the program instruction stored in the memory 1804, and can perform one or more steps in the embodiment shown in FIG. 8, or an optional implementation in the embodiment shown in FIG. 8, to implement a function of performing an operation of the relay apparatus in the foregoing methods.

The transceiver 1801 is configured to:
obtain slice information of a slice service supported by the relay apparatus;
the processor 1802 is configured to:
allocate a random access resource for the slice service; and
the transceiver 1801 is configured to:
broadcast the random access resource to a user terminal.

The processor 1802 and the transceiver 1801 are further configured to perform the steps in FIG. 8.

In this embodiment, the relay apparatus allocates the random access resource for a slice service supported by the relay apparatus, and sends the random access resource to the user terminal, so that the user terminal can accurately select the corresponding random access resource for data transmission, thereby ensuring service continuity for the user terminal.

It may be understood that, in this embodiment of this application, the relay apparatus may alternatively be a relay apparatus that has functions of the relay apparatus shown in FIG. 13 to FIG. 18. This is not specifically limited herein.

It may be clearly understood by persons skilled in the art that, for the purpose of convenient and brief description, for a detailed working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data processing method, comprising:
   receiving, by a relay apparatus, first indication information sent by a user terminal, wherein the relay apparatus is connected to at least two access network devices, and the first indication information is used to indicate a slice service requested by the user terminal; and
   sending, by the relay apparatus, the first indication information to a target access network device in the at least two access network devices;
   wherein the first indication information includes at least one of a slice identity ID of the slice service, a service type of the slice service, a slice type of the slice service, and an ID of the slice type;
   receiving the first indication information and sending the first indication information are performed before the at least two access network devices deliver the slice service to the user terminal; and
   the relay apparatus broadcasts slice information before receiving the first indication information, and the slice information includes information of slice services supported and allowed by the at least two access network devices.

2. The method according to claim 1, before sending, by the relay apparatus, the first indication information to the target access network device in the at least two access network devices, further comprising:
   generating, by the relay apparatus, a data packet that is identifiable to the target access network device, wherein the data packet comprises the first indication information.

3. The method according to claim 1, wherein the sending, by the relay apparatus, the first indication information to the target access network device in the at least two access network devices comprises:
   determining, by the relay apparatus, the target access network device based on the first indication information and slice information of a slice service supported by the relay apparatus;
   generating, by the relay apparatus, a target data packet corresponding to the target access network device, wherein the target data packet comprises the first indication information; and
   sending, by the relay apparatus, the target data packet to the target access network device.

4. The method according to claim 1, wherein the sending, by the relay apparatus, the first indication information to the target access network device in the at least two access network devices comprises:
   forwarding, by the relay apparatus, the first indication information to the at least two access network devices, wherein the at least two access network devices serve as the target access network devices.

5. The method according to claim 1, wherein the sending, by the relay apparatus, the first indication information to the target access network device in the at least two access network devices comprises:
   forwarding, by the relay apparatus, the first indication information to a master access network device connected to the relay apparatus in the at least two access network devices; and
   the method further comprises: receiving, by the relay apparatus, feedback information sent by the master access network device, wherein the feedback information is used to indicate the slice service requested in the first indication information; and
   forwarding, by the relay apparatus, the feedback information to an access network device other than the master access network device in the at least two access network devices.

6. The method according to claim 1, wherein the sending, by the relay apparatus, the first indication information to the target access network device in the at least two access network devices comprises:
   receiving, by the relay apparatus, second indication information sent by the user terminal, wherein the second indication information is used to indicate the slice service requested in the first indication information; and
   forwarding, by the relay apparatus, the first indication information to the at least two access network devices based on the second indication information, wherein the at least two access network devices serve as the target access network devices.

7. The method according to claim 1, wherein the sending, by the relay apparatus, the first indication information to the target access network device in the at least two access network devices comprises:
   forwarding, by the relay apparatus, the first indication information to a master access network device connected to the relay apparatus in the at least two access network devices, or forwarding the first indication information to a transmission link in which the master access network device is located, wherein the master access network device serves as the target access network device.

8. The method according to claim 1, wherein the sending, by the relay apparatus, the first indication information to the target access network device in the at least two access network devices comprises:
   forwarding, by the relay apparatus, the first indication information to the target access network device in the at least two access network devices based on configuration information, wherein the configuration information is used to indicate the relay apparatus to forward the first indication information to some access network devices in the at least two access network devices, and the some access network devices serve as the target access network devices; or the configuration information is used to indicate the relay apparatus to forward the first indication information to a specific access network device in the at least two access network devices that corresponds to the specific slice service, wherein the first indication information is used to indicate a specific slice service requested by the user terminal, and the specific access network device serves as the target access network device.

9. A relay apparatus, comprising a processor and a non-transitory memory storing instructions, wherein the instructions are executed by the processor to make the relay apparatus:
   receive first indication information sent by a user terminal, wherein the relay apparatus is connected to at least two access network devices, and the first indication information is used to indicate a slice service requested by the user terminal; and send the first indication information to a target access network device in the at least two access network devices;

wherein the first indication information includes at least one of a slice identity ID of the slice service, a service type of the slice service, a slice type of the slice service, and an ID of the slice type;

the relay apparatus receives the first indication information and sends the first indication information before the at least two access network devices deliver the slice service to the user terminal; and the relay apparatus broadcasts slice information before receiving the first indication information, and the slice information includes information of slice services supported and allowed by the at least two access network devices.

10. The relay apparatus according to claim 9, wherein the instructions are executed by the processor to further make the relay apparatus:

generate a data packet that is identifiable to the target access network device, wherein the data packet comprises the first indication information.

11. The relay apparatus according to claim 9, wherein the instructions are executed by the processor to further make the relay apparatus:

determine the target access network device based on the first indication information and slice information of a slice service supported by the relay apparatus; and generate a target data packet corresponding to the target access network device, wherein the target data packet comprises the first indication information; and send the target data packet to the target access network device.

12. The relay apparatus according to claim 9, wherein the instructions are executed by the processor to make the relay apparatus:

forward the first indication information to the at least two access network devices, wherein the at least two access network devices serve as the target access network devices.

13. The relay apparatus according to claim 9, wherein the instructions are executed by the processor to further make the relay apparatus:

forward the first indication information to a master access network device connected to the relay apparatus in the at least two access network devices;

receive feedback information sent by the master access network device, wherein the feedback information is used to indicate the slice service requested in the first indication information; and forward the feedback information to an access network device other than the master access network device in the at least two access network devices.

14. The relay apparatus according to claim 9, wherein the instructions are executed by the processor to further make the relay apparatus:

receive second indication information sent by the user terminal, wherein the second indication information is used to indicate the slice service requested in the first indication information; and forward the first indication information to the at least two access network devices based on the second indication information.

15. The relay apparatus according to claim 9, wherein the instructions are executed by the processor to make the relay apparatus:

forward the first indication information to a master access network device connected to the relay apparatus in the at least two access network devices, or forward the first indication information to a transmission link in which the master access network device is located, wherein the master access network device serves as the target access network device.

16. The relay apparatus according to claim 9, wherein the instructions are executed by the processor to make the relay apparatus:

forward the first indication information to the target access network device in the at least two access network devices based on configuration information, wherein the configuration information is used to indicate the relay apparatus to forward the first indication information to some access network devices in the at least two access network devices, and the some access network devices serve as the target access network devices; or the configuration information is used to indicate the relay apparatus to forward the first indication information to a specific access network device in the access network devices that corresponds to the specific slice service, wherein the first indication information is used to indicate a specific slice service requested by the user terminal, and the specific access network device serves as the target access network device.

* * * * *